Patented Oct. 15, 1929

1,731,568

UNITED STATES PATENT OFFICE

CLEMENT P. GRIFFITH, OF FORT WAYNE, INDIANA, ASSIGNOR TO S. F. BOWSER & COMPANY, INC., OF FORT WAYNE, INDIANA, A CORPORATION OF INDIANA

APPARATUS FOR DELIVERING MEASURED QUANTITIES OF WATER FROM RESERVOIRS

Application filed July 21, 1927. Serial No. 207,332.

My present invention relates in general to an apparatus for delivering water in measured quantities from a reservoir, tank or the like, and has particular reference to an apparatus of this character which is especially adapted for use in connection with concrete mixers wherein it is desired to measure the amount of water supplied to the mixer so as to insure a mix of the proper consistency.

The primary object of the invention is to provide an apparatus as above explained which will conveniently serve the purpose described, which will accurately measure the water supplied to the mixer, which may be conveniently transported from place to place when occasion arises, and which will otherwise serve its intended purpose with the greatest efficiency.

In the accompanying drawings, I have illustrated a practical embodiment of the invention, and in which:

Fig. 1 is a view in side elevation of the apparatus;

Fig. 2 is a view in front elevation of the apparatus;

Fig. 3 is a top plan view of the apparatus but showing only a portion of the reservoir or tank;

Fig. 4 is a vertical section through the valve housing; and

Fig. 5 is a plan view in detail of the operating means for selectively opening the inlet and outlet valves.

Referring to the preferred form of the apparatus illustrated in the drawings, 5 represents a reservoir which will be in the form of a metallic tank having a fluid level indicator 6 with the vent valve 7 thereof equipped with a float 7' which closes the valve when the tank is full and opens the valve when water is being drawn off so as to admit air to the tank.

Formed in the end 8 of the tank, which becomes the front of the apparatus, and preferably at substantially the lowermost level thereof is an opening equipped with a short pipe section 9 having a threaded end 10. Secured to this threaded end 10 of the pipe section 9, is a valve housing 11, ordinarily made as a casting, the same having an internally threaded boss 12 on the back thereof for securing the housing to the pipe section 9 and establishing communication between the housing and the tank 5. Formed on the bottom of the housing 11, as a part of the casting thereof, is a neck 13 having a fitting 14 on the end thereof for connecting the elbow 15 of a discharge pipe 16. The connection between the elbow 15 and the fitting 14 is such as to mount the discharge pipe 16 with freedom of rotation and to make a leak-proof joint, the fitting being provided with a packing gland of any conventional construction. The discharge pipe 16 is equipped at its outer extremity with an elbow 17 which provides an outlet for the pipe with the opening therein presented at an angle to the axis of the pipe so as to discharge the water from the side thereof.

The pipe is supported adjacent its discharge end by a connecting rod 18 having an outwardly turned end 19 which is inserted through an opening in a lug or ear 20 on the pipe 16 with a cotter pin 21 anchoring the turned end of the rod in the opening in the lug. The opposite end of this rod 18 is inserted through a yoke 22 on the end of a bracket arm 23, which projects forwardly from the end 8 of the tank, and has a base 24 which is mounted to the tank by rivets, bolts or the like 25. The side of the yoke 22 is made with an internally threaded opening for the reception of a shaft 26 which carries a hand wheel 27. By turning the hand wheel 27 to project the shaft 26 into the slot of the yoke through which the rod 18 extends, the shaft may be brought into engagement with the rod, locking the same against sliding movement.

In operating the apparatus, the idea is to deliver measured quantities of water from the tank 5 through the discharge pipe 16 and into the concrete mixer, as an example, although, of course, it may be delivered to any other suitable apparatus without in any way affecting the advantages of the invention. Considering that the communication between the discharge pipe 16 and the tank 5 is open, the water contained in the tank 5 will rise in

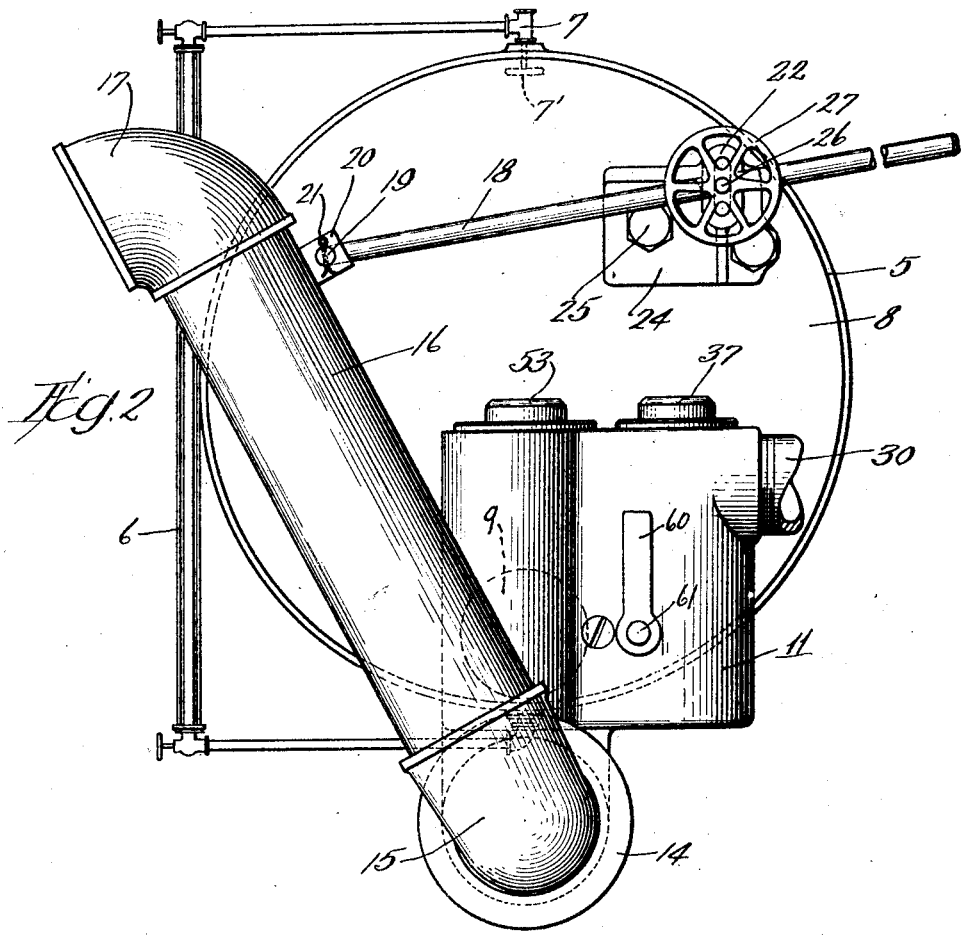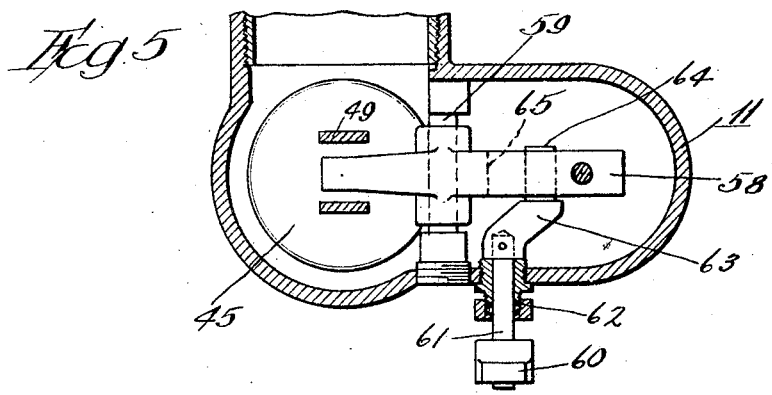

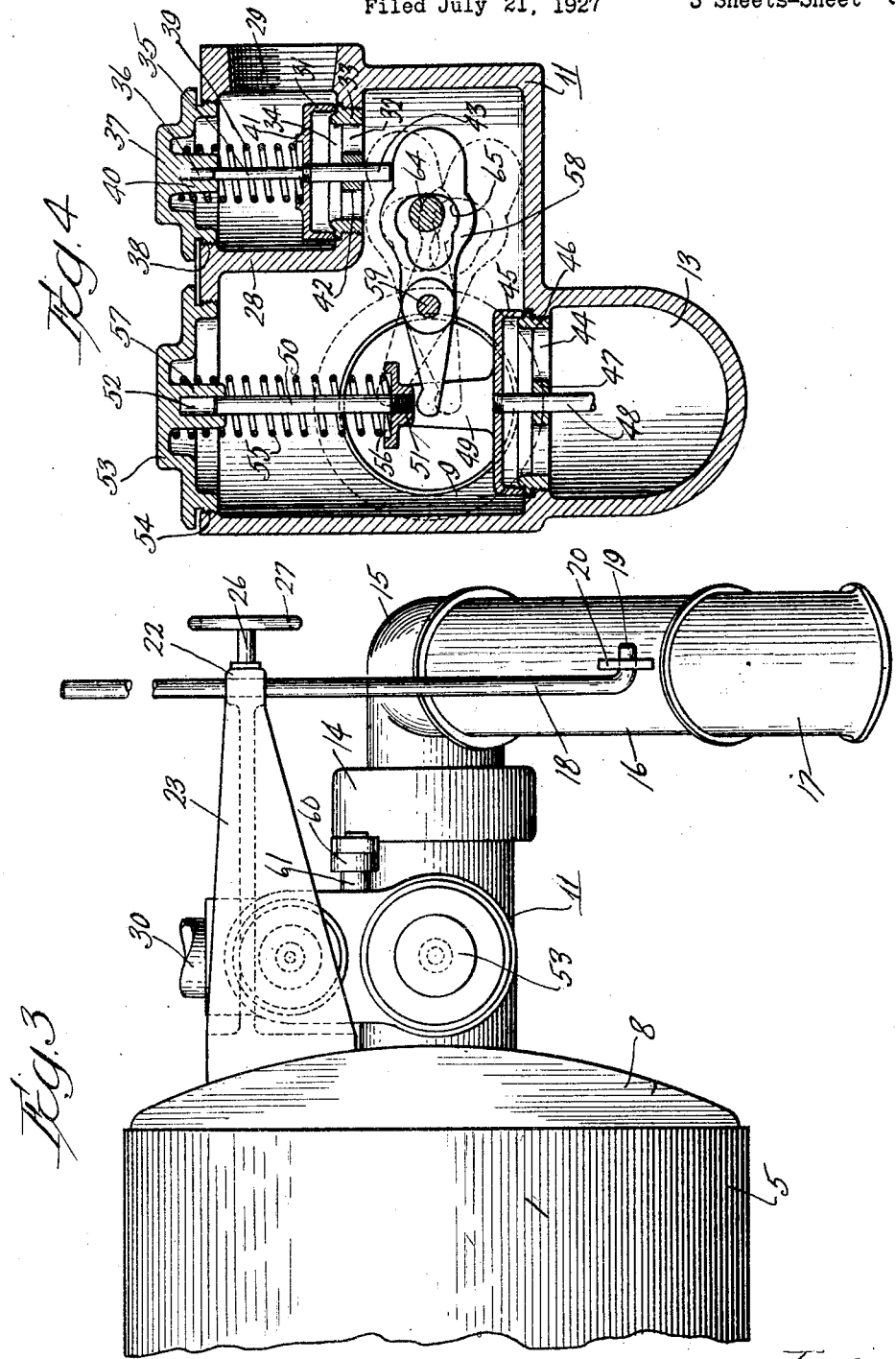

Patented Oct. 15, 1929

1,731,568

UNITED STATES PATENT OFFICE

CLEMENT P. GRIFFITH, OF FORT WAYNE, INDIANA, ASSIGNOR TO S. F. BOWSER & COMPANY, INC., OF FORT WAYNE, INDIANA, A CORPORATION OF INDIANA

APPARATUS FOR DELIVERING MEASURED QUANTITIES OF WATER FROM RESERVOIRS

Application filed July 21, 1927. Serial No. 207,332.

My present invention relates in general to an apparatus for delivering water in measured quantities from a reservoir, tank or the like, and has particular reference to an apparatus of this character which is especially adapted for use in connection with concrete mixers wherein it is desired to measure the amount of water supplied to the mixer so as to insure a mix of the proper consistency.

The primary object of the invention is to provide an apparatus as above explained which will conveniently serve the purpose described, which will accurately measure the water supplied to the mixer, which may be conveniently transported from place to place when occasion arises, and which will otherwise serve its intended purpose with the greatest efficiency.

In the accompanying drawings, I have illustrated a practical embodiment of the invention, and in which:

Fig. 1 is a view in side elevation of the apparatus;

Fig. 2 is a view in front elevation of the apparatus;

Fig. 3 is a top plan view of the apparatus but showing only a portion of the reservoir or tank;

Fig. 4 is a vertical section through the valve housing; and

Fig. 5 is a plan view in detail of the operating means for selectively opening the inlet and outlet valves.

Referring to the preferred form of the apparatus illustrated in the drawings, 5 represents a reservoir which will be in the form of a metallic tank having a fluid level indicator 6 with the vent valve 7 thereof equipped with a float 7' which closes the valve when the tank is full and opens the valve when water is being drawn off so as to admit air to the tank.

Formed in the end 8 of the tank, which becomes the front of the apparatus, and preferably at substantially the lowermost level thereof is an opening equipped with a short pipe section 9 having a threaded end 10. Secured to this threaded end 10 of the pipe section 9, is a valve housing 11, ordinarily made as a casting, the same having an internally threaded boss 12 on the back thereof for securing the housing to the pipe section 9 and establishing communication between the housing and the tank 5. Formed on the bottom of the housing 11, as a part of the casting thereof, is a neck 13 having a fitting 14 on the end thereof for connecting the elbow 15 of a discharge pipe 16. The connection between the elbow 15 and the fitting 14 is such as to mount the discharge pipe 16 with freedom of rotation and to make a leak-proof joint, the fitting being provided with a packing gland of any conventional construction. The discharge pipe 16 is equipped at its outer extremity with an elbow 17 which provides an outlet for the pipe with the opening therein presented at an angle to the axis of the pipe so as to discharge the water from the side thereof.

The pipe is supported adjacent its discharge end by a connecting rod 18 having an outwardly turned end 19 which is inserted through an opening in a lug or ear 20 on the pipe 16 with a cotter pin 21 anchoring the turned end of the rod in the opening in the lug. The opposite end of this rod 18 is inserted through a yoke 22 on the end of a bracket arm 23, which projects forwardly from the end 8 of the tank, and has a base 24 which is mounted to the tank by rivets, bolts or the like 25. The side of the yoke 22 is made with an internally threaded opening for the reception of a shaft 26 which carries a hand wheel 27. By turning the hand wheel 27 to project the shaft 26 into the slot of the yoke through which the rod 18 extends, the shaft may be brought into engagement with the rod, locking the same against sliding movement.

In operating the apparatus, the idea is to deliver measured quantities of water from the tank 5 through the discharge pipe 16 and into the concrete mixer, as an example, although, of course, it may be delivered to any other suitable apparatus without in any way affecting the advantages of the invention. Considering that the communication between the discharge pipe 16 and the tank 5 is open, the water contained in the tank 5 will rise in the pipe 16 and will be dscharged through the end thereof so long as the discharge end of the pipe is below the level of the water in the tank. By regulating the elevated position of the discharge end of the pipe relatively of the tank, a predetermined quantity of water will be discharged from the tank. This accounts for the rotatable housing for the discharge pipe, and the connecting rod 18 and the hand wheel device which co-operates therewith provides a convenient means of holding the pipe in an adjusted elevated position. By means of this connecting rod 18, the discharge end of the pipe may be brought to various elevations. When the discharge end of the pipe is at its lowermost position, the maximum quantity of water will be discharged from the tank and when it is at its uppermost adjusted position, the minimum quantity of water will be discharged or no water at all, depending, of course, on the length of the pipe.

In order to fill the tank and control the delivery of water therefrom, the valve housing 11 is equipped with inlet and outlet valved openings with means provided for their selective operation. As a practical means for accomplishing this result, attention is invited to Fig. 4 wherein the housing is shown as provided with an internal cylindrical partition 28 which communicates directly with an inlet opening 29 in the side of the housing, the latter being threaded internally for connecting the pipe line 30 communicating with a suitable source of water supply. The cylindrical partition 28 provides a sub-housing for the inlet valve 31 and the base of this sub-housing is made with an opening 32 which communicates with the main part of the housing 11 and with the valve 31 controlling the port area of the same. To provide a seat for the valve 31, the opening 32 is provided with screw threads for the reception of an annular spider ring 33 which has an annular rib 34 on the top thereof and an annular projecting flange on the outside of the ring to provide a seat for the downwardly depending flange of the valve. The valve is guided from the top by a guide rod 35 which projects into a central bore 36 provided on the under side of the cap 37 which is threaded into the opening 38 in the top of the housing. The valve is retained upon its seat under the influence of a valve spring 39, one end of which is coiled around the boss 40 in which the central bore 36 is made and with the opposite end of the spring seated upon the top of the valve 31 within an annular rib 41.

The spider ring 33 is made with a central sleeve 42 through which the push rod 43 is free to slide. This push rod is threaded into the central opening in the valve 31 co-axially of the guide rod 35. The opening 44 between the housing 11 and the neck 13 is controlled by the outlet valve 45, the same having a seat on top of the spider ring 46, the same as explained with reference to the valve 31. The spider ring 46 is made with a central sleeve 47 for the guide rod 48 of the outlet valve. Mounted on top of the outlet valve 45 is a pedestal 49 for supporting the guide rod 50, the same being threaded, as at 51, into the top of the pedestal 49 with its opposite end received and confined in a bore 52 on the under side of the cap 53 which closes the opening 54 in the top of the housing 11 adjacent the opening 38. The outlet valve 45 is retained upon its seat under the influence of a spring 55 which is coiled around the rod 50 with one end seated in a depression 56 on top of the pedestal 49 and with the opposite end of the spring embracing the annular boss 57 in which the bore 52 is made.

For the selective opening of the valves 31 and 45, I prefer to employ a rocker arm 58 which is pivoted intermediate its ends on a rock shaft 59. One end of the rocker arm terminates under the head of the pedestal 49 with the opposite end terminating under the push rod 43 of the valve 31. Provided on the outside of the housing 11 is an operating lever 60, the same being secured to the end of a shaft 61 which projects into the housing through a suitable stuffing box 62 with a short crank arm 63 on the end of the shaft having a pin 64 which is confined in the slot 65 arranged at the center of throw of the arm 58.

So long as the lever 60 is in an upstanding perpendicular position, the rocker arm 58 will be so positioned with respect to the push rod 43 and the under side of the head of the pedestal 49, as to leave the springs 39 and 55 unhampered in holding the valves 31 and 45 upon their seats, completely closing the openings 32 and 44. To fill the tank 5 with water, the lever 60 will be moved to the left which will rock the arm 58, lifting the end thereof positioned below the push rod 43, and, as a result, imparting an upward thrust to the rod 43, raising the valve 31 off its seat against the influence of the spring 39. Water is then free to flow through the intake 29 into the housing 11 through the pipe 9 and fill the tank 5. When the tank is filled, the float 7' will close the vent valve 7 so that it will not be necessary to close the inlet valve 31 until water is to be drawn off the tank.

When it is desired to deliver measured quantities of water from the tank 5 to the concrete mixer, as an example, and after proper adjusted elevation position of the discharge pipe 16 has been predetermined, the lever 60 may be thrown which will rock the arm 58 into a position where the end, shown to the left of its pivot in the drawings, will impart a thrust to the under side of the head of the pedestal 49 against the resistance of the spring 55 and lift the valve 45 off its seat, establishing a communication between the tank and the pipe 16. With this outlet open, water will be discharged through the pipe 16 until the depth in the tank has receded below the level of the discharge end of the pipe.

When the lever has been moved to open the outlet valve 45 as described the rocker arm 58 will have been moved into a position releasing the inlet valve 31 and the same returned to its seat by the spring 39. As soon as the water level recedes, the float 7' will drop and open the vent valve 7 to atmosphere.

The crank on the end of the shaft 61 locks the rocker arm 58 into either of its valve opening positions. For instance, when the lever 60 is thrown in a direction to impart a lifting action to the valve 31, the rocker arm 58 will be locked in this position so that the influence of the spring 39 cannot return the rocker arm to its inactive position. This will also avoid the necessity of holding the lever 60 when the tank is being filled or discharged. This locking of the rocker arm 58 is accomplished by the crank arm 63 and the peculiar shape of the opening 65 which receives the pin 64 on the end of the crank. In other words, the rocker arm, when in either of its two active positions, is on a dead center and cannot be moved therefrom by the influence of either of the springs, although the lever 60, of course, will develop sufficient leverage to move it off dead center so that it can be returned to its normal inactive position.

Obviously those skilled in the art may make various changes in the details and arrangement of parts without departing from the spirit and scope of the invention as defined by the claims hereto appended, and I wish therefore not to be restricted to the precise construction herein disclosed.

I claim:—

1. In an apparatus of the class described, a reservoir having an inlet for filling the same and an outlet, a discharge pipe communicating with said outlet, said pipe being movable into different elevated positions relatively of the reservoir, a valve housing through which the reservoir is filled and discharged, valves in said housing for opening and closing the inlet and outlet for the reservoir, and means for selectively operating said valves.

2. In an apparatus of the class described, a reservoir having an inlet for filling the same and an outlet communicating with a discharge pipe, said pipe being movable into different elevated positions relatively of the reservoir, a valve housing through which the reservoir is filled and discharged, valves in said housing for opening and closing the inlet and outlet for the reservoir, and means for selectively operating said valves comprising a rocker arm pivoted in the valve housing with its end disposed to impart a selective lift to the valves when the arm is rocked in opposite directions about its pivot, and means on the outside of the valve housing for operating said arm.

3. In an apparatus of the class described, a reservoir having an inlet for filling the same and an outlet communicating with a discharge pipe, said pipe being movable into different elevated positions relatively of the reservoir, a valve housing through which the reservoir is filled and discharged, valves in said housing for opening and closing the inlet and outlet for the reservoir, and means for selectively operating said valves comprising a rocker arm pivoted in the valve housing with its ends disposed to impart a selective lift to the valves when the arm is rocked in opposite directions about its pivot, and means on the outside of the valve housing for operating said arm comprising a lever, a shaft on which said lever is fixed for rotating the shaft, said shaft projecting into the valve housing and having a crank pin on the end thereof confined in a slot in said rocker arm.

4. In an apparatus of the class described, a reservoir, a valve housing secured thereto and having a communication therewith, an intake opening in the valve housing, a spring responsive valve for closing said intake opening, an outlet in the valve housing, a discharge pipe for said outlet movable into different elevated positions relatively of the reservoir, means for holding said pipe in said elevated positions, a spring responsive valve in the valve housing for closing said outlet, and means for selectively opening said inlet and outlet valves.

5. In an apparatus of the class described, a reservoir, a valve housing secured thereto and having a communication therewith, an intake opening in the valve housing, a spring responsive valve for closing said intake opening, an outlet in the valve housing, a discharge pipe for said outlet movable into different elevated positions relatively of the reservoir, means for holding said pipe in said elevated positions, a spring responsive valve in the valve housing for closing said outlet, and means for selectively opening said inlet and outlet valves comprising a rocker arm pivoted within the valve housing with its opposite ends disposed to selectively lift said valves against the resistance of the springs thereof.

6. In an apparatus of the class described, a reservoir, a valve housing secured thereto and having a communication therewith, an intake opening in the valve housing, a spring responsive valve for closing said intake opening, an outlet in the valve housing, a discharge pipe for said outlet movable into different elevated positions relatively of the reservoir, means for holding said pipe in said elevated positions, a spring responsive valve in the valve housing for closing said outlet, and means for selectively opening said inlet and outlet valves comprising a rocker arm pivoted within the valve housing with its opposite ends disposed to selectively lift said valves against the resistance of the springs thereof, and means on the outside of the valve housing for operating said rocker arm, comprising a lever, a shaft to which said lever is mounted to rotate the shaft, said shaft projecting into the valve housing and having a crank pin confined in a slot provided in said rocker arm at substantially the center of throw thereof.

In testimony whereof I have signed my name to this specification on this 11th day of July A. D. 1927.

CLEMENT P. GRIFFITH.